(12) United States Patent
Tang (10) Patent No.: US 12,335,893 B2
(45) Date of Patent: Jun. 17, 2025

(54) REGISTRATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 965 days.

(21) Appl. No.: 17/614,244

(22) PCT Filed: Nov. 20, 2018

(86) PCT No.: PCT/CN2018/116490
§ 371 (c)(1),
(2) Date: Nov. 24, 2021

(87) PCT Pub. No.: WO2020/102989
PCT Pub. Date: May 28, 2020

(65) Prior Publication Data
US 2022/0338151 A1 Oct. 20, 2022

(51) Int. Cl.
*H04W 60/00* (2009.01)
*H04W 88/06* (2009.01)

(52) U.S. Cl.
CPC .......... *H04W 60/005* (2013.01); *H04W 88/06* (2013.01)

(58) Field of Classification Search
CPC ... H04W 60/005; H04W 88/06; H04W 48/18; H04W 72/04
See application file for complete search history.

(56) References Cited

U.S. PATENT DOCUMENTS 11,224,084 B2 * 1/2022 Park .................. H04W 8/12
11,871,284 B1 * 1/2024 Edara ................. H04W 16/14
(Continued)

FOREIGN PATENT DOCUMENTS

CN 102917439 A 2/2013
CN 107071782 A 8/2017
(Continued)

OTHER PUBLICATIONS

The first Office Action of corresponding Chinese application No. 201880097292.1, dated May 30, 2022.
(Continued)

*Primary Examiner* — Julio R Perez
(74) *Attorney, Agent, or Firm* — Ladas & Parry LLP (57) ABSTRACT

The embodiments of the application disclose a registration method, a terminal device and a network device. The method includes: when the terminal device is registered on a first network through a first access technology, acquiring, by the terminal device, first slice information; when the terminal device is registered on a second network through a second access technology, acquiring, by the terminal device, second slice information, where the second slice information and the first slice information are not mutually exclusive. The method, terminal device and network device of the embodiments of the present application can ensure that slices obtained by the terminal device over multiple access technologies are not mutually exclusive, thereby ensuring the progress of services.

18 Claims, 4 Drawing Sheets

(56) References Cited

U.S. PATENT DOCUMENTS

| | | | |
|---|---|---|---|
| 2018/0324576 A1 | 11/2018 | Salkintzis | |
| 2021/0103797 A1* | 4/2021 | Jang | G06V 30/19173 |
| 2022/0338151 A1* | 10/2022 | Tang | H04W 48/18 |
| 2023/0153050 A1* | 5/2023 | Ikeda | G06F 3/14 |
| | | | 715/732 |

FOREIGN PATENT DOCUMENTS

| | | |
|---|---|---|
| CN | 108023749 A | 5/2018 |
| CN | 108323245 A | 7/2018 |
| CN | 108366365 A | 8/2018 |
| CN | 108370398 A | 8/2018 |
| CN | 108401275 A | 8/2018 |
| CN | 108616959 A | 10/2018 |
| CN | 108632945 A | 10/2018 |
| CN | 109246813 A | 1/2019 |

OTHER PUBLICATIONS

The first Office Action of corresponding Chinese application No. 201880097292.1, dated May 30, 2022 with machine translation.

International Search Report (ISR) dated Aug. 19, 2019 for Application No. PCT/CN2018/116490.

3GPP Telecommunication management;Study on management and orchestration of network slicing for next generation network (Release 14) TR 28.801 V0.3.0 (Nov. 2016)Technical Specification Group Services and System Aspects(Nov. 30, 2016).

3GPP 3rd Generation Partnership Project, Technical Specification Group Services and System Aspects; Study on Enhancement of Network Slicing (Release 16) TR 23.740 V0.6.0 (Oct. 2018).

* cited by examiner

REGISTRATION METHOD, TERMINAL DEVICE AND NETWORK DEVICE

CROSS-REFERENCE TO RELATED APPLICATIONS

This application is a national stage of the International application PCT/CN2018/116490, filed on Nov. 20, 2018, entitled "REGISTRATION METHOD, TERMINAL DEVICE AND NETWORK DEVICE", the content of which is hereby incorporated by reference in its entirety.

TECHNICAL FIELD

The embodiments of the present application relate to the field of communications and, in particular, to a registration method, a terminal device and a network device.

BACKGROUND

In a 5G network, a terminal device can be registered on a network through multiple access technologies. For example, the 3rd Generation Partnership Project (3GPP) and the Non-3rd Generation Partnership Project (N3GPP).

When a terminal device is registered on the network through multiple access technologies, how to ensure the progress of the service is an urgent problem to be solved.

SUMMARY

The embodiments of the present application provide a registration method, a terminal device and a network device, which can ensure that slices obtained by the terminal device based on multiple access technologies are not mutually exclusive, thereby ensuring the progress of the service.

In a first aspect, a registration method is provided. The method includes: when a terminal device is registered on a first network through a first access technology, acquiring, by the terminal device, first slice information; when the terminal device is registered on a second network through a second access technology, acquiring, by the terminal device, second slice information, where the second slice information and the first slice information are not mutually exclusive.

In a second aspect, a registration method is provided. The method includes: when a terminal device is registered on a second network through a second access technology, sending, by a network device in the second network, second slice information to the terminal device, where the second slice information and first slice information are not mutually exclusive, and the first slice information is acquired when the terminal device is registered on a first network through a first access technology.

In a third aspect, a terminal device is provided, which is configured to perform the method according to the implementation forms of the first aspect or to the first aspect as such.

Specifically, the terminal device includes a functional module for performing the method according to the implementation forms of the first aspect or to the first aspect as such.

In a fourth aspect, a network device is provided, which is configured to perform the method according to the implementation forms of the second aspect or to the second aspect as such.

Specifically, the network device includes a functional module for performing the method according to the implementation forms of the second aspect or to the second aspect as such.

In a fifth aspect, a terminal device is provided, including a processor and a memory. The memory is configured to store a computer program, and the processor is configured to call and run the computer program stored in the memory, so as to perform the method according to the implementation forms of the first aspect or to the first aspect as such.

In a sixth aspect, a network device is provided, including a processor and a memory. The memory is configured to store a computer program, and the processor is configured to call and run the computer program stored in the memory, so as to perform the method according to the implementation forms of the second aspect or to the second aspect as such.

In a seventh aspect, a chip is provided, which is configured to implement the method according to any one of the implementation forms of the first to second aspects or to any one of the first to second aspects as such.

Specifically, the chip includes: a processor, configured to call and run a computer program from the memory, so that the device installed with the chip performs the method according to any one of the implementation forms of the first to second aspects or to any one of the first to second aspects as such.

In an eighth aspect, a computer-readable storage medium is provided for storing a computer program that enables a computer to perform the method according to any one of the implementation forms of the first to second aspects or to any one of the first to second aspects as such.

In a ninth aspect, a computer program product is provided, including computer program instructions that cause a computer to perform the method according to any one of the implementation forms of the first to second aspects or to any one of the first to second aspects as such.

In a tenth aspect, a computer program is provided, when it is executed on a computer, the computer performs the method according to any one of the implementation forms of the first to second aspects or to any one of the first to second aspects as such.

Through the above technical solution, the first slice information acquired by the terminal device by registration on the network through the first access technology and the second slice information acquired by registration on the network through the second access technology can ensure the progress of the service.

DESCRIPTION OF EMBODIMENTS

The technical solutions in the embodiments of the present application will be described below in conjunction with the accompanying drawings in the embodiments of the present application. Obviously, the described embodiments are a part of the embodiments of the present application, not all of the embodiments. Based on the embodiments of the present application, all other embodiments obtained by those of ordinary skill in the art without creative work are within the protection scope of the present application.

The technical solutions of the embodiments of the present application can be applied to various communication systems, such as Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system.

Figure 1:
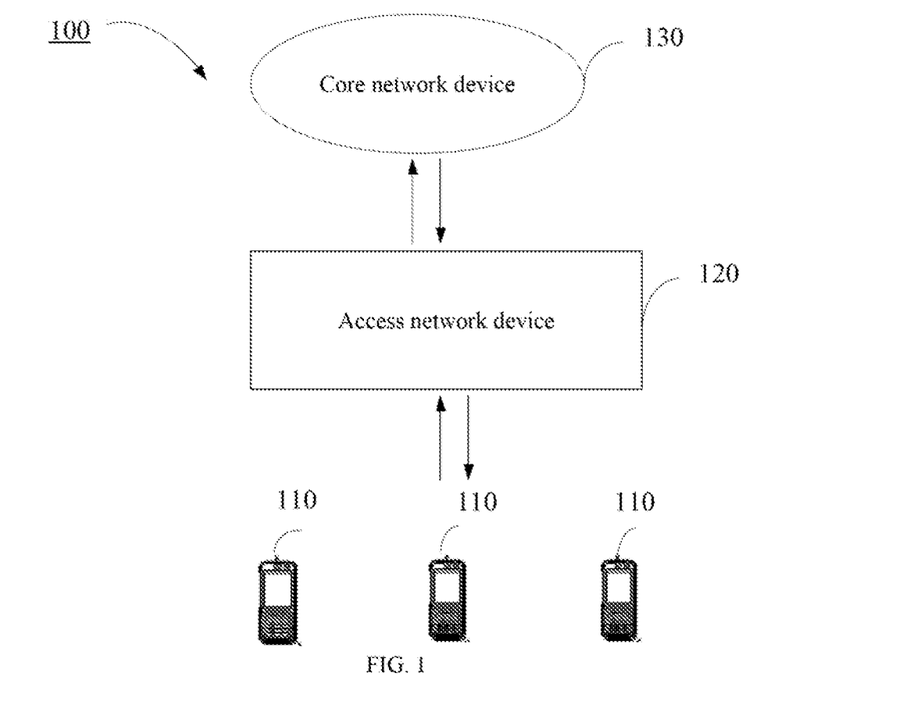
FIG. 1 is a schematic diagram of a communication system architecture provided by an embodiment of the present application.

Exemplarily, the communication system 100 applied in the embodiments of the present application is shown in FIG. 1. The communication system 100 may include a terminal device 110, and the terminal device 110 may be located within the coverage area of the access network device 120. As used herein, "terminal device" includes, but is not limited to connection via wired lines, such as via Public Switched Telephone Networks (PSTN), Digital Subscriber Line (DSL), digital cables and direct cable connections; and/or another data connection/network; and/or connection via a wireless interface, such as for cellular networks, Wireless Local Area Networks (WLAN), digital TV networks such as DVB-H networks; satellite networks; AM-FM broadcast transmitter; and/or a device of another terminal device that is set to receive/send communication signals; and/or Internet of Things (IoT) device. A terminal device set to communicate through a wireless interface may be referred to as a "wireless communication terminal", a "wireless terminal" or a "mobile terminal". Examples of mobile terminals include, but are not limited to: satellite or cellular phones; Personal Communications System (PCS) terminals that can combine cellular radio phones with data processing, fax, and data communication capabilities; PDA that can include radio phones, pagers, Internet/intranet access, Web browser, memo pad, calendar, and/or Global Positioning System (GPS) receiver; and conventional laptop and/or palmtop receivers or others electronic devices including radio telephone transceivers. Terminal devices can refer to access terminals. User Equipment (UE), User Units, User Stations, Mobile Stations, Mobile Platform, Remote Stations, Remote Terminals, Mobile Device, User Terminals, Terminals. Wireless Communication Device, User Agents, or User Equipment. The access terminal can be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, a terminal device in 5G networks, or a terminal device in the future evolution of PLMN, etc.

The communication system 100 may include an access network device 120, and the access network device 120 may be a device that communicates with a terminal device 110 (or may be called a "communication terminal" or "terminal"). The access network device 120 can provide communication coverage for a specific geographic area, and can communicate with terminal devices located in the coverage area. In an embodiment, the access network device 120 may be a Base Transceiving Station (BTS) in a GSM system or a CDMA system, or a NodeB (NB) in a WCDMA system, or an Evolutional Node B (eNB or eNodeB), or wireless controller in WCDMA system, or an Evolutional Node B, eNB or eNodeB in an LTE system, or a wireless controller in a Cloud Radio Access Network (CRAN); or the network device can be the mobile switching center, relay station, access point, or in-vehicle device, wearable device, hub, switch, bridge, router, network side device in 5G networks, or network device in the future evolved Public Land Mobile Network (PLMN), etc.

The wireless communication system 100 also includes a core network device 130 that communicates with access network devices. In an embodiment, the core network device 130 may be a 5G core network device. For example, the Access and Mobility Management Function (AMF) is used for access and mobility management, and has functions such as user authentication, switching, and location updating. For another example, the Session Management Function (SMF) is used for session management, including the establishment, modification, and release of packet data unit (PDU) sessions. Again, for another example, the user plane function (UPF) is used for forwarding user data. The core network device may be the core network device of the LTE system or other systems.

In an embodiment, the 5G system or 5G network may also be referred to as a New Radio (NR) system or NR network.

It should be understood that the terms "system" and "network" are often used interchangeably herein. The term "and/or" used herein is only an association relationship that describes the associated objects, which means that there can be three relationships, for example, A and/or B, which may indicate: A exists alone, A and B exist at the same time, B exists alone. In addition, the character "/" used herein generally indicates that the associated objects are in an "or" relationship.

In an embodiment, the embodiments of the present application may be used in public land networks or local networks.

The public land network may be based on PLMN.

A local network can also be called a local area network or a private network. The local network is usually deployed in office scenes, home scenes, and factories, to realize more effective and safer management. Typically, local users or managers will deploy the local network, and the authorized users have access to the local network.

The local network can be managed or governed by the public land network. However, it may not be managed or governed by the public land network.

In an embodiment, the local network may use an unlicensed frequency band for communication, or may also share an authorized frequency band with a public land network.

In an embodiment, the local network may be a network belonging to the 3GPP. The core network of the local network may be a core network of NR or LTE, and the local network may be connected to the core network through an NR access network, an LTE access network or a Wireless Fidelity (Wifi).

In the embodiments of the present application, the public land network and the local network may share a core network, and the access network is independent; or, they may share an access network, and the core network is independent; or, they may share both the access network and the core network; or, neither the access network and nor the core network is shared.

In the embodiments of the present application, multiple or multiple types of local networks may share a core network, and the access network is independent; or, they may share the access network, and the core network is independent; or, they may share both the access network and the core network; or, neither the access network and nor the core network is shared.

In a 5G network, the UE can be registered on the network through multiple access technologies at the same time. For example, the UE can be registered on the network through the 3GPP access technology and the N3GPP access technology at the same time. The 3GPP access technology may be GPRS, UTRAN, E-UTRAN, LTE, or NR, etc., and the N3GPP access technology may be Wireless Local Area Networks (WLAN), etc. The UE may also be registered on the network through three access technologies of LTE, NR, and WLAN at the same time, or be registered on the network through more access technologies at the same time, which is not limited by the embodiments of the present application.

If the UE is registered on the network through the 3GPP access technology and the N3GPP access technology at the same time, the UE is required to be registered on the network twice, and each time the UE is registered, the UE may send network slice selection assistance information (NSSAI) to the corresponding network device, and the corresponding network device may provide the UE with Allowed NSSAI corresponding to the access technology.

Rel-16's network slicing introduces therein the concept of slice mutual exclusion, that is, some UEs' subscribed slices do not allow the UEs to access at the same time. For example, for security, work phones for the police are not allowed to connect to the police dedicated slice and the ordinary Enhance Mobile Broadband (eMBB) slice at the same time.

Figure 2:
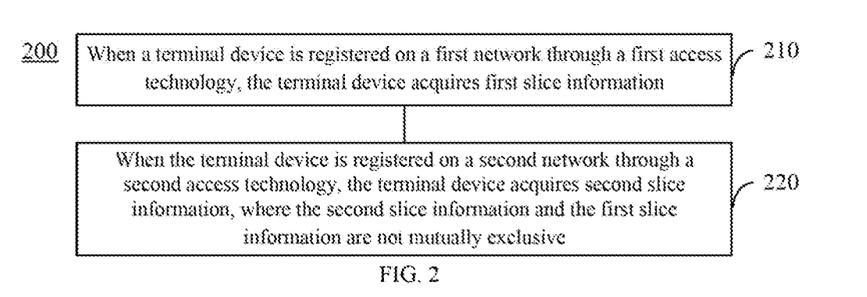
FIG. 2 is a schematic diagram of a registration method provided by an embodiment of the present application.

FIG. 2 illustrates a schematic block diagram of a registration method 200 according to an embodiment of the present application. As shown in FIG. 2, the method 200 includes some or all of the following contents:

S210, when a terminal device is registered on a first network through a first access technology, the terminal device acquires first slice information; and S220, when the terminal device is registered on a second network through a second access technology, the terminal device acquires second slice information, where the second slice information and the first slice information are not mutually exclusive.

When the terminal device is registered on the network through different access technologies at the same time, the terminal device can request non-mutually exclusive slices, so that the progress of the service can be ensured. Specifically, registration of the terminal device on the network through the first access technology may include: sending, by the terminal device, request slice information to the network element in the first network, for example, the aforementioned Requested NSSAI. The network element in the first network provides the first slice information to the terminal device based on the Requested NSSAI sent by the terminal device, which may be the foregoing Allowed NSSAI, for example. Similarly, registration of the terminal device on the network through the second access technology may include: sending, by the terminal device, request slice information to the network element in the second network, for example, the aforementioned Requested NSSAI. The network element in the second network provides the second slice information to the terminal device based on the Requested NSSAI sent by the terminal device, which may be the foregoing Allowed NSSAI, for example.

The request slice information may be slice information requested by the terminal device. For example, the slice information may be single network slice selection assistance information (S-NSSAI) 1, S-NSSAI2, and S-NSSAI3. The network device may determine, according to a mutually exclusive relationship, whether the slice requested by the request slice information belongs to the allowed slice over the access technology. For example, if the network element in the first network judges that S-NSSA1, S-NSSAI2, and S-NSSA1 in S-NSSAI3 are not allowed over the first access technology, the first slice information provided by the network element in the first network to the terminal device may include S-NSSAI2 and S-NSSAI3. In this case, the first slice information may be referred to as Allowed NSSAI.

In the embodiment of the present application, the first slice information and the second slice information are not mutually exclusive, which may indicate that the Allowed NSSAI provided by the network element in the first network to the terminal device and the Allowed NSSAI provided by the network element in the second network to the terminal device are not mutually exclusive. For example, if S-NSSAI1 and S-NSSAI3 are mutually exclusive, the first slice information and the second slice information cannot include S-NSSAI1 and S-NSSAI3, respectively.

It should be understood that the first network and the second network in the embodiment of the present application may be the same or different. Typically, the terminal device is registered on a PLMN through access technologies. The PLMN can be a registered PLMN (RPLMN), an equivalent PLMN (EPLMN), an equivalent a home PLMN (EHPLMN), a home PLMN (HPLMN), or a visited PLMN (VPLMN), etc. For example, if the first network and the second network are different, the first network and the second network may be one of HPLMN and VPLMN, respectively, or the first network and the second network may be different VPLMNs, etc. If the first network and the second network are the same, the first network and the second network may both be any of the aforementioned PLMNs. For example, the first network and the second network may be the same VPLMN or the same HPLMN.

It should also be understood that it is described herein by taking an example of the simultaneous registration on the network through two access technologies, but the embodiment of the present application is not limited thereto. The access technology has been described above, which will not be repeated herein for brevity.

In the embodiment of the present application, when the terminal device is registered on the second network through the second access technology, the acquiring, by the terminal device, the second slice information, including: when the terminal device is registered on the second network through the second access technology, sending, by the terminal device, first request slice information to the network device in the second network, and the first request slice information and the first slice information are not mutually exclusive; receiving, by the terminal device, the second slice information sent by the network device in the second network, and the second slice information includes a subset or a full set of the first request slice information.

Specifically, after the terminal device is registered on the first network through the first access technology, the terminal device may determine, according to the first slice information acquired from the network element in the first network, the request slice information sent when the terminal device is registered on the second network through the second access technology, so that the request slice information and the first slice information are not mutually exclusive. The request slice information may carry slice information to be requested from the network element in the second network. For example, if the first slice information includes S-NSSAI1, S-NSSAI2 and S-NSSAI3, if the terminal device determines that S-NSSAI2 and S-NSSAI4 are mutually exclusive based on the mutually exclusive relationship, the request slice information sent by the terminal device to the network element in the second network will not include S-NSSAI4.

After receiving the request slice information sent by the terminal device, the network element in the second network may first determine whether the slice requested by the request slice information is allowed over the second access technology. If they are all allowed, the second slice information determined by the network element in the second network may be a subset (or a full set) of the slice information requested by the request slice information. If part of it is not allowed, the second slice information determined by the network element in the second network may also be a subset (or a full set) of the rest of the request slice information except for the disallowed part.

In an embodiment, the network slices may be divided into groups, and the slice information acquired by the terminal device each time it is registered may include at least one group. When determining that the request slice information sent to the network element in the second network and the first slice information are not mutually exclusive, the terminal device may make determination through group information of both the network slice group included in the first slice information and the network slice group included in the request slice information. For example, the first slice information includes a network slice group 1, a network slice group 2, and a network slice group 3, and the terminal device learns that the network slice group 3 and a network slice group 4 are mutually exclusive, then the request slice information sent to the network in the second network may not include the network slice group 4. For example, the request slice information may include the network slice group 1, the network slice group 3 and a network slice group 5, and the network slice group 5 and the network slice group included in the first slice information are mutually exclusive. In an embodiment, the group information may be a group identifier.

In the embodiment of the present application, when the terminal device is registered on the second network through the second access technology, the acquiring, by the terminal device, the second slice information, includes: when the terminal device is registered on the second network through the second access technology, sending, by the terminal device, first request slice information to a network device in the second network, and the first request slice information carries at least a part of the first slice information; receiving, by the terminal device, the second slice information sent by the network device in the second network.

In other words, as for determining that the first slice information and the second slice information are not mutually exclusive, it can be achieved by determining, by the terminal device, that the request slice information sent to the network element in the second network and the first slice information are not mutually exclusive, as well as by the network element in the second network. Specifically, the terminal device may make the request slice information sent to the network element in the second network carry at least a part of the first slice information. For example, the terminal device may carry some network slices that are mutually exclusive and included in the first slice information in the request slice information. For another example, the terminal device may also carry information of the network slice that is mutually exclusive with the first slice information in the request slice information directly. Alternatively, the terminal device may directly carry all the first slice information in the request slice information, for determination by the network.

After the network element in the second network receives the request slice information, the second slice information may be determined according to the information that is related to the first slice information and is carried in the request slice information. For example, the request slice information carries some network slices that have a mutually exclusive relationship and are included in the first slice information. If the terminal device determines that S-NSSAI1 and S-NSSAI3 included in the first slice information are mutually exclusive, identifiers of both the S-NSSAI1 and S-NSSAI3 can be carried in the request slice information. After receiving the request slice information, the network element in the second network can know that the S-NSSAI1 and S-NSSAI3 are mutually exclusive. The network element in the second network may further determine, based on the mutually exclusive relationship, that S-NSSAI2 and S-NSSAI4 are mutually exclusive with S-NSSAI1 and S-NSSAI3. Then the network element in the second network may not include S-NSSAI2 and S-NSSAI4 in the second slice information. For another example, the terminal device may also directly carry the information of the network slice that has a mutually exclusive relationship with the first slice information in the request slice information. If the terminal device has determined that S-NSSAI2 and S-NSSAI4 are mutually exclusive with S-NSSAI1 and S-NSSAI3 included in the first slice information, that is to say, the identifiers of both S-NSSAI2 and NSSAI4 can be carried in the request slice information. After receiving the request slice information, the network element in the second network can know directly that the S-NSSAI2 and S-NSSAI4 are mutually exclusive with the first slice are mutually exclusive with the first slice information, and the network element in the second network may not include S-NSSAI2 and S-NSSAI4 in the second slice information. Again, for another example, the terminal device may also directly carry all the first slice information in the request slice information. If the first slice information includes S-NSSAI1, S-NSSAI3 and S-NSSAI5, the identifiers of S-NSSAI1, S-NSSAI3 and S-NSSAI5 can be included in the request slice information. After receiving the request slice information, the network element in the second network can determine whether S-NSSAI1, S-NSSAI3 and S-NSSAI5 are mutually exclusive with other network slices according to the mutually exclusive relationship, and the fact that S-NSSAI2 and S-NSSAI4 are mutually exclusive with S-NSSAI1 and S-NSSAI3 respectively can be determined either. Thus, the network element in the second network may not include S-NSSAI2 and S-NSSAI4 in the second slice information.

In the embodiment of the present application, the method further includes: when the terminal device is registered on the second network through the second access technology, acquiring, by the terminal device, third slice information, the third slice information is the updated first slice information, and the third slice information includes a subset or a full set of the first slice information.

In other words, if the request slice information sent to the network element in the second network carries some content of the first slice information, the network element in the second network can determine the second slice information, and can also further update the first slice information. And it can be guaranteed that the second slice information and the updated first slice information are not mutually exclusive. From the perspective of the terminal device, after receiving the updated first slice information, the terminal device uses the updated first slice information to perform service processing related to the first access technology.

It should be noted that the updated first slice information may be a subset or a full set of the first slice information acquired from a network element in the first network. For example, the network element in the second network can update the first slice information by itself. For example, the first slice information includes S-NSSAI1, S-NSSAI3 and S-NSSAI5, while the S-NSSAI1 is desired to be used over the second access technology, the network element in the second network can directly remove S-NSSAI1 from the first slice information and carry the S-NSSAI1 in the second slice information. Alternatively, the network element in the second network may also update the first slice information or determine the second slice information based on the priority of each S-NSSAI. For example, the first slice information includes S-NSSAI1, S-NSSAI3, and S-NSSAI5, and the value of S-NSSAI1 has the highest priority. If the S-NSSAI1 is required to be used over the second access technology, the value of S-NSSAI1 in the first slice information may be replaced, and the value of S-NSSAI1 obtained from the network element in the first network is carried in the second slice information.

In the embodiment of the present application, the request slice information sent to the network element in the second network may also carry priority information of each S-NSSAI, or the S-NSSAI in the request slice information can also be prioritized. In other words, the priority can be a single piece of information to indicate the priority, or the priority of each S-NSSAI can be reflected by sorting, which is not limited by the embodiments of the present application. Alternatively, the priority of each S-NSSAI can also be directly stored in the network device, and they are not required to be sent by the terminal device to the network device.

It should be noted that the priority in the embodiment of the present application may be the sorting among the S-NSSAIs, or the sorting among values of the S-NSSAIs.

In the embodiment of the present application, the network element in the first network and/or the network element in the second network may be an AMF or other network elements.

In an embodiment, if the first network and the second network are the same, the first slice information includes Allowed NSSAI over the first access technology. The first request slice information and/or the second slice information include Allowed NSSAI over the second access technology.

For example, if the terminal device is registered on a HPLMN through the 3GPP access technology, and it is registered on the HPLMN through the N3GPP access technology, the first slice information includes Allowed NSSAI over 3GPP, and the first request slice information carries Allowed NSSAI over N3GPP. Similarly, the second slice information may also include Allowed NSSAI over N3GPP. Similarly, if the terminal device is registered on the VPLMN through the 3GPP access technology and is registered on the VPLMN through the N3GPP access technology, the first slice information includes Allowed NSSAI over 3GPP, the first request slice information carries Allowed NSSAI over N3GPP, and the second slice information may also include Allowed NSSAI over N3GPP.

In an embodiment, the first network and the second network may also be different. For example, the first network may be a HPLMN, and the second network may be a VPLMN. For another example, the first network may be a VPLMN, and the second network may be a HPLMN. Or the first network and the second network may be different networks of the same type. For example, they can be different VPLMNs.

It should be noted that in case that the first network and the second network are different, when the terminal device is registered on a network, not only the slice information can be acquired, but also a mapping relationship of the S-NSSAI under the two networks can be acquired.

In an embodiment, if the first network is a home public land mobile network HPLMN, and the second network is a visiting public land mobile network VPLMN, the first slice information includes allowed network slice selection auxiliary information NSSAI by registration on the first network through the first access technology, and the first request slice information and/or the second slice information include a mapping relationship between single network slice selection assistance information S-NSSAI by registration on the second network through the second access technology and home public land mobile network HPLMN S-NSSAI.

For example, if the terminal device is registered on a HPLMN through the 3GPP access technology and is registered on a VPLMN through the N3GPP access technology, the first slice information includes Allowed NSSAI over 3GPP. If the first request slice information carries slice information requested over N3GPP, the first request slice information may carry a mapping relationship between each HPLMN NSSAI and VPLMN NSSAI in Allowed NSSAI over N3GPP. If the first request slice information carries at least part of the first slice information, the first request slice information may carry Allowed NSSAI over 3GPP. While the second slice information may carry a mapping relationship between each HPLMN NSSAI and VPLMN NSSAI in Allowed NSSAI over N3GPP.

In an embodiment, if the first network is a VPLMN and the second network is a HPLMN, the first slice information includes a mapping relationship between S-NSSAI by registration on the first network through the first access technology and HPLMN S-NSSAI, and the first request slice information and/or the second slice information include Allowed NSSAI by registration on the second network through the second access technology.

For example, if the terminal device is registered on a VPLMN through the 3GPP access technology and is registered on a HPLMN through the N3GPP access technology, the first slice information includes a mapping relationship between each HPLMN NSSAI and VPLMN NSSAI in Allowed NSSAI over 3GPP. If the first request slice information carries slice information requested over N3GPP, the first request slice information may carry Allowed NSSAI over N3GPP. If the first request slice information carries at least part of the first slice information, the first request slice information may carry a mapping relationship between each HPLMN NSSAI and VPLMN NSSAI in Allowed NSSAI over 3GPP. The second slice information may carry Allowed NSSAI over N3GPP.

In an embodiment, if the first network and the second network are different VPLMNs, the first slice information includes a mapping relationship between S-NSSAI by registration in the first network through the first access technology and the HPLMN S-NSSAI, the first request slice information and/or the second slice information include a mapping relationship between S-NSSAI by registration on the second network through the second access technology and HPLMN S-NSSAI.

For example, if the terminal device is registered on the VPLMN through the 3GPP access technology and is registered on the VPLMN through the N3GPP access technology, and the two VPLMNs are different, the first slice information includes a mapping relationship between each HPLMN NSSAI and VPLMN NSSAI in Allowed NSSAI over 3GPP. If the first request slice information carries slice information requested over N3GPP, the first request slice information may carry the mapping relationship between each HPLMN NSSAI and VPLMN NSSAI in Allowed NSSAI over N3GPP. If the first request slice information carries at least part of the first slice information, the first request slice information may carry the mapping relationship between each HPLMN NSSAI and VPLMN NSSAI in Allowed NSSAI over 3GPP while the second slice information may carry the mapping relationship between each HPLMN NSSAI and VPLMN NSSAI in Allowed NSSAI over N3GPP.

Figure 3:
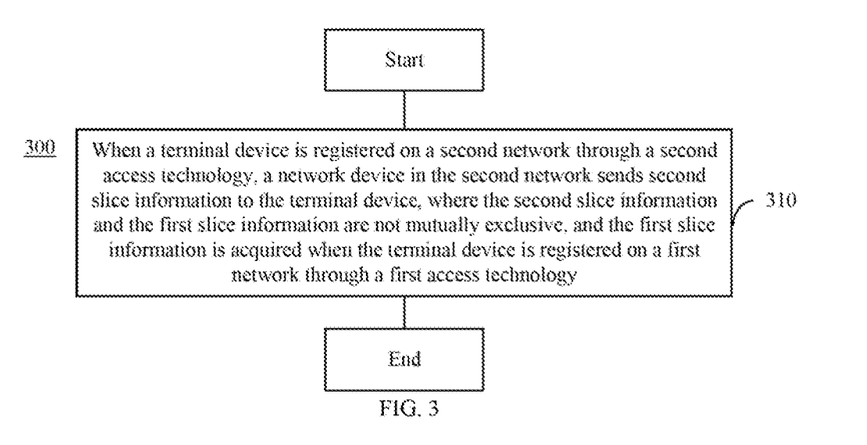
FIG. 3 is another schematic diagram of a registration method provided by an embodiment of the present application.

FIG. 3 is a schematic block diagram of a registration method 300 according to an embodiment of the present application. As shown in FIG. 3, the method 300 includes some or all of the following contents:

S310, when a terminal device is registered on a second network through a second access technology, a network device in the second network sends second slice information to the terminal device, where the second slice information and the first slice information are not mutually exclusive, and the first slice information is acquired when the terminal device is registered on a first network through a first access technology.

In the embodiment of the present application, when the terminal device is registered on the second network through the second access technology, the sending, by a network device in the second network, second slice information to the terminal device, includes: when the terminal device is registered on the second network through the second access technology, receiving, by the network device in the second network, first request slice information sent by the terminal device, where the first request slice information and the first slice information are not mutually exclusive; and determining, by the network device in the second network, second slice information according to the first request slice information, where the second slice information includes a subset or a full set of the first request slice information.

In the embodiment of the present application, when the terminal device is registered on the second network through the second access technology, the sending, by a network device in the second network, second slice information to the terminal device, includes: when the terminal device is registered on the second network through the second access technology, receiving, by the network device in the second network, first request slice information sent by the terminal device, where the first request slice information carries at least part of the first slice information; and determining, by the network device in the second network, the second slice information according to the first request slice information.

In the embodiment of the present application, the method further includes: when the terminal device is registered on the second network through the second access technology, determining, by the network device in the second network slices information, third slice information according to the first request slice information, where the third slice information is the updated first slice information, and the third slice information includes a subset or a full set of the first slice information; and sending, by the network device in the second network, the third slice information to the terminal device.

In the embodiment of the present application, the first request slice information further includes priority information of each single network slice selection assistance information S-NSSAI, and/or each single network slice selection assistance information S-NSSAI in the first request slice information has the priority order, the determining, by the network device in the second network, third slice information and the second slice information according to the first request slice information, includes: determining, by the network device in the second network, the second slice information and the third slice information according to at least part of the first slice information, the priority information and/or the priority order and a mutually exclusive relationship.

In the embodiment of the present application, if the first network and the second network are the same, the first slice information includes Allowed NSSAI over the first access technology, and the first request slice information and/or the second slice information include Allowed NSSAI over the second access technology.

In the embodiment of the present application, if the first network is a home public land mobile network HPLMN, the second network is a visiting public land mobile network VPLMN, the first slice information includes Allowed NSSAI by registration on the first network through the first access technology and the first request slice information and/or the second slice information include a mapping relationship between single network slice selection assistance information S-NSSAI by registering on the second network through the second access technology and home public land mobile network HPLMN S-NSSAI.

In the embodiment of the present application, if the first network is a visiting public land mobile network VPLMN and the second network is a home public land mobile network HPLMN, the first slice information includes a mapping relationship between single network slice selection assistance information S-NSSAI by registration on the first network through the first access technology and home public land mobile network HPLMN S-NSSAI, the first request slice information and/or the second slice information include Allowed NSSAI by registration on the second network through the second access technology.

In the embodiment of the present application, if the first network and the second network are different VPLMNs and the first slice information includes a mapping relationship between S-NSSAI by registration on the first network through the first access technology and home public land mobile network HPLMN S-NSSAI, and the first request slice information and/or the second slice information include a mapping relationship between single network slice selection assistance information S-NSSAI by registration on the second network through the second access technology and home public land mobile network HPLMN S-NSSAI.

In the embodiment of the present application, the first access technology is the 3GPP access technology, and the second access technology is a N3GPP; or the first access technology is a N3GPP, and the second access technology is the 3GPP access technology.

It should be understood that the interaction between the network device and the terminal device described by the network device and related characteristics and functions correspond to those of the terminal device. That is to say, messages sent by the network device to the terminal device are just the corresponding ones receiving by the terminal device from the network device.

It should also be understood that, in various embodiments of the present application, the sequence number of the above-mentioned processes does not indicate the order of execution. The execution sequence of each process should be determined by its function and internal logic, which should not constitute any limitation on implementation process of the embodiments of the present application.

The registration method according to the embodiment of the present application is described in detail above. The following will describe the registration device according to the embodiment of the present application with reference to FIGS. 4-7. The technical features described in the method embodiments are applicable to the following device embodiments.

Figure 4:
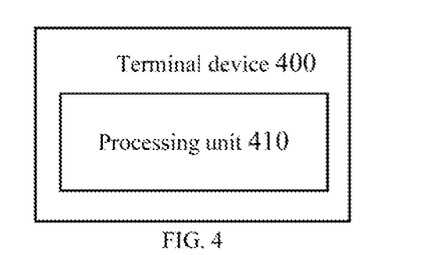
FIG. 4 is a schematic block diagram of a terminal device provided by an embodiment of the present application.

FIG. 4 illustrates a schematic block diagram of a terminal device 400 according to an embodiment of the present application. As shown in FIG. 4, the terminal device 400 includes:

a processing unit 410, configured to acquire first slice information when the terminal device is registered on the first network through the first access technology, and to acquire the second slice information when the terminal device is registered on the second network through the second access technology, where the second slice information and the first slice information are not mutually exclusive.

In the embodiment of the present application, the processing unit 410 is specifically configured to: when the terminal device is registered on the second network through the second access technology, send the first request slice information to the network device in the second network, where the first request slice information and the first slice information are not mutually exclusive; receive the second slice information sent by the network device in the second network, where the second slice information includes a subset or a full set of the first request slice information.

In the embodiment of the present application, the processing unit 410 is specifically configured to: when the terminal device is registered on the second network through the second access technology, send first request slice information to a network device in the second network, where the first request slice information carries at least part of the first slice information; and receive the second slice information sent by the network device in the second network.

In the embodiment of the present application, the processing unit 410 is further configured to: acquire third slice information when the terminal device is registered on the second network through the second access technology, where the third slice information is the updated first slice information, and the third slice information includes a subset or a full set of the first slice information.

In the embodiment of the present application, the first request slice information further includes priority information of each single network slice selection assistance information S-NSSAI, and/or each single network slice selection assistance information S-NSSAI in the first request slice information has a priority order.

In the embodiment of the present application, if the first network and the second network are the same, the first slice information includes Allowed NSSAI over the first access technology, the first request slice information and/or the second slice information include Allowed NSSAI over the second access technology.

In the embodiment of the present application, if the first network is a home public land mobile network HPLMN and the second network is a visiting public land mobile network VPLMN, the first slice information includes Allowed NSSAI by registration on the first network through the first access technology, and the first request slice information and/or the second slice information include a mapping relationship between S-NSSAI by registration on the second network through the second access technology and home public land mobile network HPLMN S-NSSAI.

In the embodiment of the present application, if the first network is a visiting public land mobile network VPLMN and the second network is a home public land mobile network HPLMN, the first slice information includes a mapping relationship between single network slice selection assistance information S-NSSAI by registration on the first network through the first access technology and home public land mobile network HPLMN S-NSSAI, the first request slice information and/or the second slice information include Allowed network slice selection assistance information NSSAI by registration on the second network through the second access technology.

In the embodiment of the present application, if the first network and the second network are different VPLMNs, the first slice information includes a mapping relationship between single network slice selection assistance information S-NSSAI by registration on the first network through the first access technology and home public land mobile network HPLMN S-NSSAI, the first request slice information and/or the second slice information include a mapping relationship between S-NSSAI by registration on the second network through the second access technology and home public land mobile network HPLMN S-NSSAI.

In the embodiment of the present application, the first access technology is the 3GPP access technology, and the second access technology is a N3GPP; or the first access technology is a N3GPP, and the second access technology is a 3GPP access technology.

It should be understood that the terminal device 400 according to the embodiment of the present application may correspond to the terminal device in the method embodiment of the present application. In addition, the above-mentioned and other operations and/or functions of each unit in the terminal device 400 are respectively intended to implement the corresponding processes of the terminal device in the method of FIG. 2, which will not be repeated herein for brevity.

Figure 5:
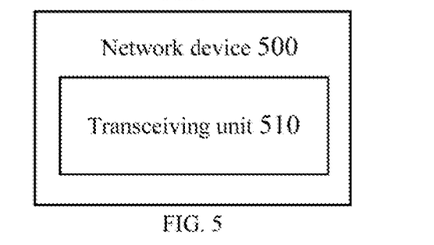
FIG. 5 is a schematic block diagram of a network device provided by an embodiment of the present application.

FIG. 5 illustrates a schematic block diagram of a network device 500 according to an embodiment of the present application. As shown in FIG. 5, the network device is a network device in the second network, and the network device 500 includes:

a transceiving unit 510, configured to send second slice information to the terminal device when the terminal device is registered on the second network through the second access technology, where the second slice information and the first slice information are not mutually exclusive, and the first slice information is acquired when the terminal device is registered on the first network through the first access technology.

In the embodiment of the present application, the transceiving unit is specifically configured to: receive first request slice information sent by the terminal device when the terminal device is registered on the second network through the second access technology, where the first request slice information and the first slice information are not mutually exclusive; determine the second slice information according to the first request slice information, where the second slice information includes a subset or a full set of the first request slice information.

In the embodiment of the present application, the transceiving unit is specifically configured to: receive first request slice information sent by the terminal device when the terminal device is registered on the second network through the second access technology, where the first request slice information carries at least part of the first slice information; determine, according to the first request slice information, the second slice information.

In the embodiment of the present application, the network device further includes: a processing unit, configured to determine third slice information according to the first request slice information when the terminal device is registered on the second network through the second access technology, where the third slice information is the updated first slice information, and the third slice information includes a subset or a full set of the first slice information: the transceiving unit is specifically configured to: send the third slice information to the terminal device.

In the embodiment of the present application, the first request slice information further includes priority information of each single network slice selection assistance information S-NSSAI, and/or each single network slice selection assistance information S-NSSAI in the first request slice information has a priority order; the processing unit is specifically configured to: determine the second slice information and the third slice information according to at least part of the first slice information, the priority information and/or the priority order and a mutually exclusive relationship.

In the embodiment of the present application, if the first network and the second network are the same, the first slice information includes Allowed NSSAI over the first access technology, and the first request slice information and/or the second slice information include Allowed NSSAI over the second access technology.

In the embodiment of the present application, if the first network is a home public land mobile network HPLMN, the second network is a visiting public land mobile network VPLMN, the first slice information includes Allowed NSSAI by registration on the first network through the first access technology, and the first request slice information and/or the second slice information include a mapping relationship between single network slice selection assistance information S-NSSAI by registration on the second network through the second access technology and home public land mobile network HPLMN S-NSSAI.

In the embodiment of the present application, if the first network is a visiting public land mobile network VPLMN and the second network is a home public land mobile network HPLMN, the first slice information includes a mapping relationship between single network slice selection assistance information S-NSSAI by registration on the first network through the first access technology and home public land mobile network HPLMN S-NSSAI, the first request slice information and/or the second slice information include Allowed network slice selection assistance information NSSAI by registration on the second network through the second access technology.

In the embodiment of the present application, if the first network and the second network are different VPLMNs, the first slice information includes a mapping relationship between single network slice selection assistance information S-NSSAI by registration on the first network through the first access technology and home public land mobile network HPLMN S-NSSAI, the first request slice information and/or the second slice information include a mapping relationship between S-NSSAI by registration on the second network through the second access technology and home public land mobile network HPLMN S-NSSAI.

In the embodiment of the present application, the first access technology is the 3GPP access technology, and the second access technology is a N3GPP; or the first access technology is a N3GPP, and the second access technology is a 3GPP access technology.

Figure 6:
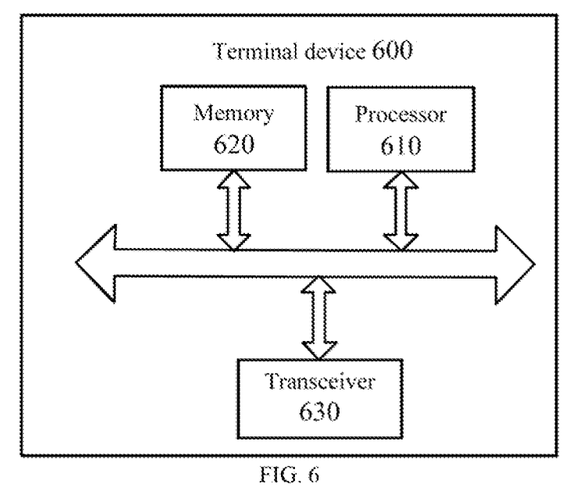
FIG. 6 is another schematic block diagram of a terminal device provided by an embodiment of the present application.

As shown in FIG. 6, an embodiment of the present application also provides a terminal device 600. The terminal device 600 may be the terminal device 400 in FIG. 4, which can be configured to execute the content of the terminal device corresponding to the method 200 in FIG. 2. The terminal device 600 shown in FIG. 6 includes a processor 610. The processor 610 may call and run a computer program from the memory to implement the method according to the embodiment of the present application.

In an embodiment, as shown in FIG. 6, the terminal device 600 may further include a memory 620. The processor 610 may call and run a computer program from the memory 620 to implement the method according to the embodiment of the present application.

The memory 620 may be a separate device independent of the processor 610, or may be integrated in the processor 610.

In an embodiment, as shown in FIG. 6, the terminal device 600 may further include a transceiving 630. The processor 610 may control the transceiving 630 to communicate with other devices. Specifically, it can send information or data to other devices, or receive information or data sent by other devices.

The transceiving 630 may include a transmitter and a receiver. The transceiving 630 may further include an antenna, and the number of antennas may be one or more.

In an embodiment, the terminal device 600 may be a terminal device of the embodiment of the present application, and the terminal device 600 may implement the corresponding processes implemented by the terminal device in each method of the embodiment of the present application, which will not be repeated herein for brevity.

In a specific implementation form, the processing unit in the terminal device 400 may be implemented by the processor 610 in FIG. 6.

Figure 7:
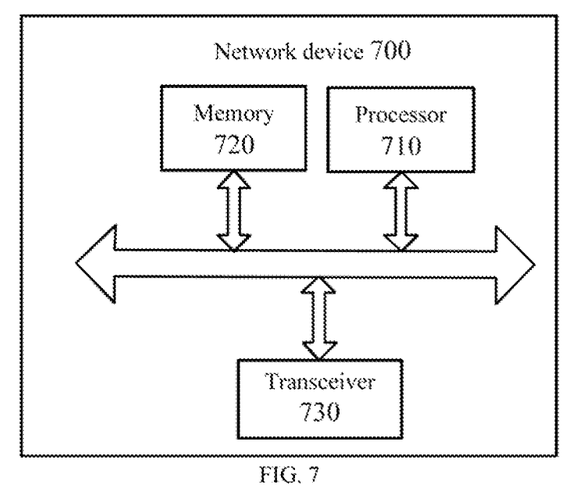
FIG. 7 is another schematic block diagram of a network device provided by an embodiment of the present application.

As shown in FIG. 7, an embodiment of the present application also provides a network device 700. The network device 700 may be the network device 500 in FIG. 5, which can be configured to execute the content of the network device corresponding to the method 300 in FIG. 6. The network device 700 shown in FIG. 7 includes a processor 77. The processor 77 can call and run a computer program from the memory to implement the method according to the embodiment of the present application.

In an embodiment, as shown in FIG. 7, the network device 700 may further include a memory 720. The processor 77 can call and run a computer program from the memory 720 to implement the method according to the embodiment of the present application.

The memory 720 may be a separate device independent of the processor 710, or may be integrated in the processor 77.

In an embodiment, as shown in FIG. 7, the network device 700 may further include a transceiving 730. The processor 77 can control the transceiving 730 to communicate with other devices. Specifically, it can send information or data to other devices, or receive information or data sent by other devices.

The transceiving 730 may include a transmitter and a receiver. The transceiving 730 may further include an antenna, and the number of antennas may be one or more.

In an embodiment, the network device 700 may be the network device of the embodiment of the application. In addition, the network device 700 may implement the corresponding processes implemented by the network device in each method in the embodiment of the present application, which will not be repeated herein for brevity.

In a specific implementation form, the transceiving unit in the network device 500 may be implemented by the transceiving 730 in FIG. 7.

Figure 8:
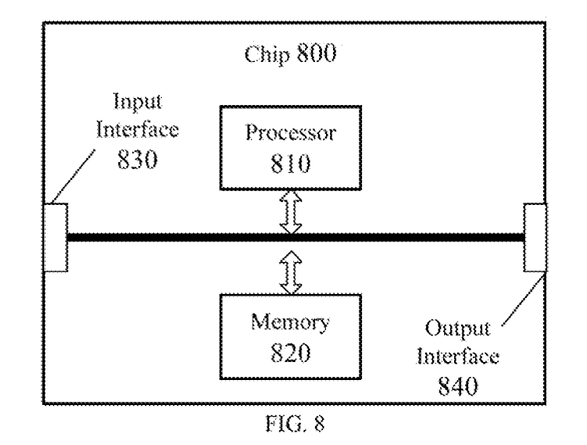
FIG. 8 is a schematic block diagram of a chip provided by an embodiment of the present application.

FIG. 8 is a schematic structural diagram of a chip of an embodiment of the present application. The chip 800 shown in FIG. 8 includes a processor 810. The processor 810 may call and run a computer program from the memory to implement the method according to the embodiment of the present application.

In an embodiment, as shown in FIG. 8, the chip 800 may further include a memory 820. The processor 810 may call and run a computer program from the memory 820 to implement the method according to the embodiment of the present application.

The memory 820 may be a separate device independent of the processor 810, or may be integrated in the processor 810.

In an embodiment, the chip 800 may further include an input interface 830. The processor 810 can control the input interface 830 to communicate with other devices or chips, and specifically, can acquire information or data sent by other devices or chips.

In an embodiment, the chip 800 may further include an output interface 840. The processor 810 may control the output interface 840 to communicate with other devices or chips. Specifically, it can output information or data to other devices or chips.

In an embodiment, the chip can be applied to the network device in the embodiment of the present application, and the chip can implement the corresponding processes implemented by the network device in each method of the embodiment of the present application, which will not be repeated herein for brevity.

In an embodiment, the chip can be applied to the terminal device in the embodiment of the present application, and the chip can implement the corresponding processes implemented by the terminal device in each method of the embodiment of the present application, which will not be repeated herein for brevity.

It should be understood that the chips mentioned in the embodiments of the present application may also be referred to as system-level chips, system chips, chip system, or system-on-chips.

Figure 9:
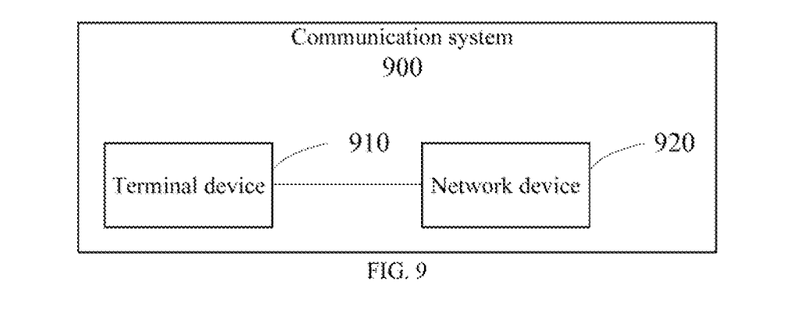
FIG. 9 is a schematic block diagram of a communication system provided by an embodiment of the present application.

FIG. 9 is a schematic block diagram of a communication system 900 according to an embodiment of the present application. As shown in FIG. 9, the communication system 900 includes a terminal device 910 and a network device 920.

The terminal device 910 can be configured to implement the corresponding function implemented by the terminal device in the above method, and the network device 920 can be configured to implement the corresponding function implemented by the network device in the above method, which will not be repeated herein for brevity.

It should be understood that the terms "system" and "network" are often used interchangeably herein. The term "and/or" used herein is only an association relationship that describes the associated objects, which means that there can be three relationships, for example. A and/or B, which may indicate: A exists alone. A and B exist at the same time, or B exists alone. In addition, the character "/" used herein generally indicates that the associated objects are in an "or" relationship.

It should be understood that the processor of the embodiment of the present application may be an integrated circuit chip with the signal processing capability. In the implementation process, the steps of the foregoing method embodiments can be completed by an integrated logic circuit of hardware in the processor or by instructions in the form of software. The above-mentioned processor can be a General Purpose Processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application can be implemented or executed. The General Purpose Processor may be a microprocessor or the processor may also be any conventional processor or the like. The steps of the method disclosed in the embodiments of the present application can be directly embodied as being executed and completed by a hardware decoding processor, or executed and completed by a combination of hardware and software modules in the decoding processor. The software module can be located in a mature storage medium in the field such as a random access memory, a flash memory, read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present application may be a volatile memory or a non-volatile memory, or may include both the volatile memory and the non-volatile memory. Where the non-volatile memory can be a Read-Only Memory (ROM), a Programmable Read-Only Memory (Programmable ROM, PROM), an erasable programmable read-only memory (Erasable PROM, EPROM), and an Electrically Programmable Read-Only Memory (Electrically EPROM, EEPROM) or a flash memory. The volatile memory may be a Random Access Memory (RAM), which is used as an external cache. By way of example rather than limiting illustration, many forms of RAM are available, such as Static Random Access Memory (Static RAM, SRAM), a Dynamic Random Access Memory (Dynamic RAM, DRAM), a Synchronous Dynamic Random Access Memory (Synchronous DRAM, SDRAM), a Double Data Rate SDRAM (DDR SDRAM), an Enhanced Synchronous Dynamic Random Access Memory (Enhanced SDRAM, ESDRAM), a Synchronous Link Dynamic Random Access Memory (Synchlink DRAM, SLDRAM)) and a Direct Rambus RAM (DR RAM). It should be noted that the memories of the systems and methods described herein are intended to include, but are not limited to, these and any other suitable types of memories.

It should be understood that the above-mentioned memory is exemplary but not restrictive, for example, the memory in the embodiment of the present application may also be a static random access memory (static RAM, SRAM), a dynamic random access memory (dynamic RAM, DRAM), a synchronous dynamic random access memory (synchronous DRAM, SDRAM), a dual Double data rate synchronous dynamic random access memory (double data rate SDRAM, DDR SDRAM), an enhanced synchronous dynamic random access memory (enhanced SDRAM, ESDRAM), a synchronous connection dynamic random access memory (synch link DRAM, SLDRAM), a direct Memory bus random access memory (Direct Rambus RAM, DR RAM), etc. That is, the memory in the embodiments of the present application is intended to include, but not limited to, these and any other suitable types of memory.

The embodiments of the present application also provide a computer-readable storage medium for storing computer programs.

In an embodiment, the computer-readable storage medium can be applied to the network device in the embodiment of the present application, and the computer program causes the computer to execute the corresponding processes implemented by the network device in each method of the embodiment of the present application, which will not be repeated herein for brevity.

In an embodiment, the computer-readable storage medium may be applied to the terminal device in the embodiment of the present application, and the computer program enables the computer to execute the corresponding processes implemented by the mobile terminal/terminal device in each method in the embodiments of the present application, which will not be repeated herein for brevity.

The embodiments of the present application also provide a computer program product, including computer program instructions.

In an embodiment, the computer program product can be applied to the network device in the embodiment of the present application, and the computer program instructions cause the computer to execute the corresponding processes implemented by the network device in each method of the embodiment of the present application, which will not be repeated herein for brevity.

In an embodiment, the computer program product can be applied to the terminal device in the embodiment of the present application, and the computer program instructions cause the computer to execute the corresponding processes implemented by the mobile terminal/terminal device in each method of the embodiment of the present application, which will not be repeated herein for brevity.

The embodiments of the present application also provide a computer program.

In an embodiment, the computer program can be applied to the network device in the embodiment of the present application. When the computer program runs on the computer, it causes the computer to execute the corresponding processes implemented by the network device in each method of the embodiment of the present application, which will not be repeated herein for brevity.

In an embodiment, the computer program can be applied to the terminal device in the embodiment of the present application. When the computer program runs on the computer, it causes the computer to execute the corresponding processes implemented by the terminal device in each method of the embodiment of the present application, which will not be repeated herein for brevity.

Those of ordinary skill in the art will appreciate that the units and algorithm steps of the examples described in combination with the embodiments disclosed herein can be implemented by electronic hardware or a combination of computer software and electronic hardware. Whether these functions are executed by hardware or software depends on the specific application and design constraints of the technical solution. The professional technicians can use different methods for each specific application to implement the described functions, but such implementation should not be considered to be beyond the scope of the present application.

Those skilled in the art can clearly understand that, for convenience and concise description, the specific working process of the above-described system, device, and unit can refer to the corresponding processes in the foregoing method embodiments, and will not be repeated herein.

In the several embodiments provided by the present application, it should be understood that the disclosed system, device, and method may be implemented in other ways. For example, the device embodiments described above are merely illustrative. For example, the division of the units is only a logical function division, and there may be other divisions in actual implementation For example, multiple units or components may be combined or be integrated into the another system, or some features can be ignored or not implemented. In addition, coupling or direct coupling or communication connection shown or discussed herein may be an indirect coupling or communication connection through some interfaces, devices or units, and may be in electrical, mechanical or other forms.

The units described as separate components may or may not be physically separate. The components displayed as units may or may not be physical units, that is, they may be located in one place, or may be distributed to multiple network units. Some or all of the units may be selected according to actual needs to achieve the objectives of the solutions of the embodiments.

In addition, the functional units in the various embodiments of the present application may be integrated into one processing unit, or each unit may exist alone, physically, or two or more units may be integrated into one unit.

If the functions are implemented in the form of a software functional unit and sold or used as independent products, they can be stored in a computer readable storage medium. Based on this understanding, the technical solution of the present application, or the part contributing to the existing technology or the part of the technical solution can be embodied, in essence, in the form of a software product. The computer software product is stored in a storage medium and includes instructions for enabling a computer device (which may be a personal computer, a server, or a network device, etc.) to perform all or part of the steps of the methods described in the various embodiments of the present application. The aforementioned storage media includes various media that can store program code, such as a USB flash disk, a mobile hard disk, a Read-Only Memory (ROM), a Random Access Memory (RAM), a magnetic disks or an optical disks.

The above is only a specific implementation form of the present application, the protection scope of the present application is not limited thereto, and changes or substitutions that can easily be thought of by those skilled in the art within the technical scope disclosed in the present application should be covered by the scope of protection of the present application. Therefore, the scope of protection of the present application should be subject to the scope of protection of the claims.

The invention claimed is:

1. A registration method performed by a terminal device the method comprises:
   acquiring by the terminal device first slice information when the terminal device is registered on a first network through a first access technology; and acquiring, by the terminal device, second slice information when the terminal device is registered on a second network through a second access technology, wherein the second slice information and the first slice information are not mutually exclusive.

2. The method according to claim 1, wherein, the acquiring, by the terminal device, the second slice information when the terminal device is registered on the second network through the second access technology, comprises:
when the terminal device is registered on the second network through the second access technology, sending, by the terminal device, first request slice information to a network device in the second network, wherein the first request slice information and the first slice information are not mutually exclusive; and
receiving, by the terminal device, the second slice information sent by the network device in the second network, wherein the second slice information comprises a subset or a full set of the first request slice information.

3. The method according to claim 2, wherein the first request slice information further comprises priority information of each single network slice selection assistance information (S-NSSAI), and/or each S-NSSAI in the first request slice information has a priority order.

4. The method according to claim 2, wherein, if the first network and the second network are the same, the first slice information comprises Allowed network slice selection assistance information (NSSAI) over the first access technology, and at least one of the first request slice information and the second slice information comprises Allowed NSSAI over the second access technology.

5. The method according to claim 1, wherein, the first access technology is a 3rd Generation Partnership Project (3GPP) access technology, and the second access technology is a Non-3rd Generation Partnership Project (N3GPP) access technology; or the first access technology is the N3GPP access technology, and the second access technology is the 3GPP access technology.

6. A registration method performed by a network device, the method comprises:
sending, by the network device in a second network, second slice information to a terminal device when the terminal device is registered on the second network through a second access technology, and the first slice information is acquired by the terminal device when the terminal device is registered on a first network through a first access technology, wherein the second slice information and first slice information are not mutually exclusive.

7. The method according to claim 6, wherein, the sending, by the network device in a second network, the second slice information to the terminal device when the terminal device is registered on the second network through the second access technology, comprises:
when the terminal device is registered on the second network through the second access technology, receiving, by the network device in the second network, first request slice information sent by the terminal device, wherein the first request slice information and the first slice information are not mutually exclusive; and
determining, by the network device in the second network, the second slice information according to the first request slice information, wherein the second slice information comprises a subset or a full set of the first request slice information.

8. The method according to claim 7, wherein the first request slice information further comprises priority information of each single network slice selection assistance information (S-NSSAI), and/or each S-NSSAI in the first request slice information has a priority order.

9. The method according to claim 7, wherein, if the first network and the second network are the same, the first slice information comprises Allowed network slice selection assistance information (NSSAI) over the first access technology, and at least one of the first request slice information and the second slice information comprises Allowed NSSAI over the second access technology.

10. The method according to claim 6, wherein, the first access technology is a 3rd Generation Partnership Project (3GPP) access technology, and the second access technology is a Non-3rd Generation Partnership Project (N3GPP) access technology; or, the first access technology is the N3GPP access technology, and the second access technology is the 3GPP access technology.

11. A terminal device, comprising:
a processor and a memory, wherein the memory is configured to store a computer program, and the processor is configured to:
acquire first slice information when the terminal device is registered on a first network through a first access technology, and acquire second slice information when the terminal device is registered on a second network through a second access technology, wherein the second slice information and the first slice information are not mutually exclusive.

12. The terminal device according to claim 11, wherein the terminal device comprises a transceiver, and the processor is configured to control the transceiver to:
when the terminal device is registered on the second network through the second access technology, send first request slice information to a network device in the second network, wherein the first request slice information and the first slice information are not mutually exclusive; and receive the second slice information sent by the network device in the second network, wherein the second slice information comprises a subset or a full set of the first request slice information.

13. The terminal device according to claim 12, wherein the first request slice information further comprises priority information of each single network slice selection assistance information (S-NSSAI), and/or each S-NSSAI in the first request slice information has a priority order.

14. The terminal device according to claim 12, wherein, if the first network and the second network are the same, the first slice information comprises Allowed network slice selection assistance information (NSSAI) over the first access technology, and the first request slice information and/or the second slice information comprise Allowed NSSAI over the second access technology.

15. The terminal device according to claim 11, wherein, the first access technology is a 3rd Generation Partnership Project (3GPP) access technology, and the second access technology is a Non-3rd Generation Partnership Project (N3GPP) access technology; or, the first access technology is the N3GPP access technology, and the second access technology is the 3GPP access technology.

16. A network device, wherein the network device is the network device in a second network and comprises: a processor, a transceiver and a memory, wherein the memory is configured to store a computer program, and the processor is configured to call and run the computer program stored in the memory, so as to perform the method according to claim 6.

17. A non-transitory computer-readable storage medium, wherein the computer-readable storage medium is configured to store a computer program that enables a computer to perform the method according to claim 1.

18. A non-transitory computer-readable storage medium, wherein the computer-readable storage medium is configured to store a computer program that enables a computer to perform the method according to claim 6.

* * * * *